Aug. 19, 1969  M. L. POLANYI  3,461,856
OXIMETERS
Filed Oct. 23, 1965
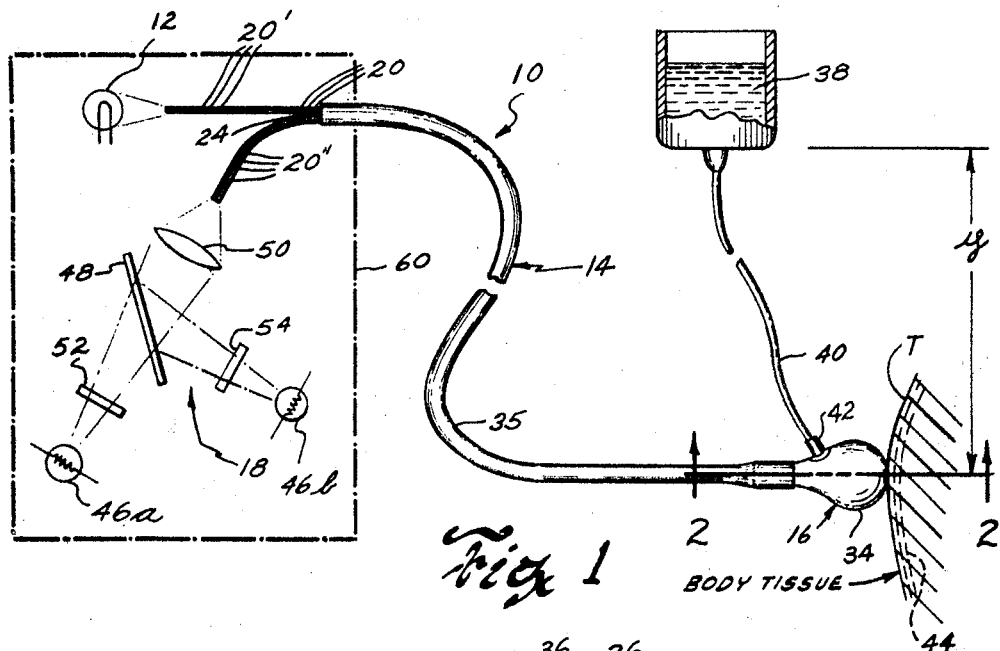
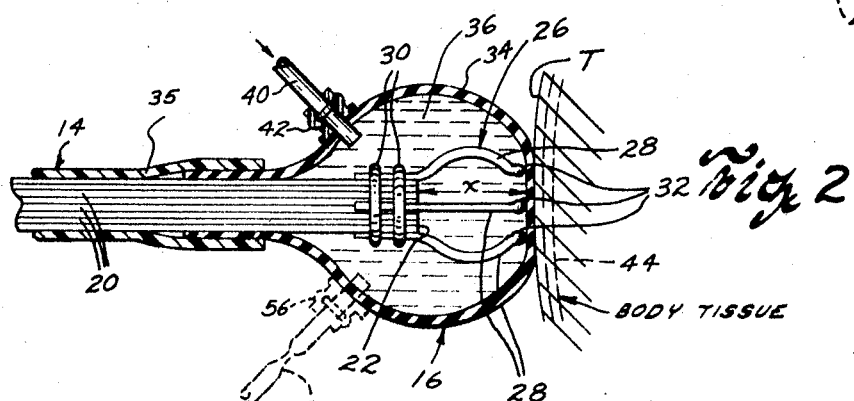
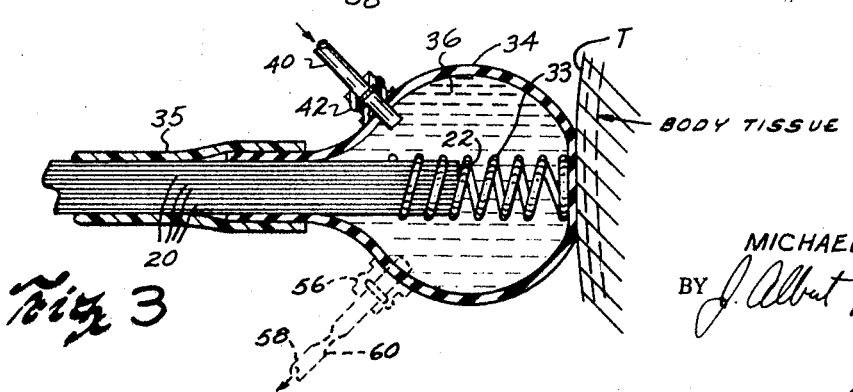
INVENTOR.
MICHAEL L. POLANYI
BY
ATTORNEY

United States Patent Office 3,461,856
Patented Aug. 19, 1969

3,461,856
OXIMETERS
Michael L. Polanyi, Webster, Mass., assignor, by mesne assignments, to American Optical Corporation, Southbridge, Mass., a corporation of Delaware
Filed Oct. 23, 1965, Ser. No. 503,484
Int. Cl. A61b 5/10
U.S. Cl. 128—2    15 Claims

ABSTRACT OF THE DISCLOSURE

A tissue oximeter probe comprising a long and slender fiber optical light conductor having a bulbous membrane of pliable transparent material at one end. The membrane is filled with a transparent fluid and placed against body tissue to be examined. Light directed by afferent fibers of the light conductor passes through the fluid and membrane into the tissue wherein portions thereof are diffusely reflected back through the membrane and fluid into efferent fibers of the light conductor to instrumentation for determining therefrom the oxygen saturation of blood in the tissue.

---

This invention relates to oximeters and has particular reference to an oximeter for determining the oxygen saturation of blood perfusing within a body tissue such as the skin.

An object of the invention is to provide for greater than usual facility and accuracy in the measurement of oxygen saturation and/or monitoring of changes in oxygen saturation of arterial blood circulating in body tissues.

To attain the aforesaid object and others which may appear from the following detailed description, in accordance with principles of my invention, I provide a tissue oximeter which includes a source of illumination and a long and slender flexible probe formed of a multiplicity of individually light-insulated afferent and efferent flexible light-conducting fibers. Such fibers are bundled together in side-by-side relationship adjacent a distal one end of the probe and extend in such relationship through a substantial portion of the length of the probe toward its other or proximal end. There afferent fibers are separated from the bundle and positioned to receive light from the source of illumination for conduction of such light to the distal end of the probe while the efferent fibers are grouped together and positioned to direct light carried thereby to light-analyzing means.

At the distal end of the probe, I provide a transparent fluid containing sensing head which is at least partly flexible to conform instantaneously to the configuration and/or changes in configuration of a portion of body tissue to be examined when pressed lightly thereagainst. The sensing head forms a fluid optical path between the distal end of the fibers and body tissue along which afferent light is conducted from the fibers to the tissue. In entering the tissue, the light becomes characterized as by partial absorption of certain wavelengths according to the amount of oxygen contained in blood perfusing the tissue whereupon unabsorbed quantities of the light are reflected or returned by back scattering into the sensing head. In the sensing head the returned light is recovered by the efferent fibers and conducted to the proximal end of the probe where it is photoelectrically analyzed for the purpose of either monitoring changes in oxygen saturation of the blood or determining absolute measurement thereof, whichever is desired.

The present invention will be more fully understood by reference to the following detailed description which is accompanied by a drawing in which FIG. 1 illustrates in elevation and partly schematically an embodiment of the present invention;

FIG. 2 is an enlarged longitudinal cross section of a portion of the improved oximeter of my invention taken generally along line 2—2 of FIG. 1; and FIG. 3 illustrates a modification of the oximeter.

In FIG. 1, oximeter 10 includes light source 12 in the form of a tungsten filament lamp or the equivalent and long and slender flexible fiber optical probe 14 having sensing head 16 and photoelectric light analyzing means 18.

Probe 14 comprises a multiplicity of flexible light-conducting fibers 20. Each fiber is formed of a relatively high refractive index glass or plastic clad with a thin layer of lower refractive index glass or plastic which functions as a light-insulating medium rendering the fiber individually conductive to light by total internal reflection. Fibers 20 are randomly arranged in side-by-side bundled relationship throughout the major portion of the length of probe 14 from distal end face 22 thereof (see FIG. 2) to bifurcation 24 (see FIG. 1) adjacent the opposite or proximal end of the probe. At bifurcation 24, fibers 20 of the bundle are separated into two groups as afferent fibers 20′ for conducting light from source 12 to face 22 and efferent fibers 20″ for conducting light from face 22 to light analyzing means 18.

Fibers 20 are secured together in their bundled relationship adjacent face 22 as by means of cement or by fusion of one to another so as to prevent separation and relative longitudinal displacement of their corresponding one ends which make up face 22. Extending forwardly from face 22 is cage 26 formed of a number, preferably three or more, of spaced wire prongs 28. Prongs 28 are secured adjacent their one ends to the bundle of fibers 20 by wire bands 30 and/or cement. Opposite free ends 32 of prongs 28 terminate in a plane disposed parallel to face 22 at a predetermined distance $x$ therefrom, such as from 2 to 5 millimeters. They thus form a foot within head 16 by means of which face 22 becomes automatically disposed parallel to the surface of a specimen T to be examined when ends 32 all bear against the specimen surface (see FIG. 2). Alternatively, cage 26 comprise a compression spring 33 (see FIG. 3) having one of its ends fixed upon the bundle of fibers 20 and its opposite end adapted to bear against the surface of specimen T as a locating foot. With such an arrangement the spring will adjust to slight movement of the specimen and head 16 one toward the other without applying such force to the tissue as to substantially change the circulation of blood therein.

Cage 26 and a portion of the adjacent end of the bundle of fibers 20 are surrounded by a bulbous membrane 34 of soft and pliable transparent rubber or the equivalent. Membrane 34 is necked down so that it tightly surrounds the bundle of fibers 20 rearwardly of cage 26 as can be seen in FIG. 2. It is there cemented or otherwise sealed in fluid-tight relationship with the fiber bundle. A hose clamp or the like, not shown, may be used as a substitute for or to supplement the cement in making the fluid-tight connection. From such connection to a point adjacent the opposite proximal end of probe 14 fibers 20 are protected from abuse by a thin flexible sheath 35.

Membrane 34 is filled with a clear fluid 36 such as water directed thereinto under pressure for elevated supply 38 through tube 40. Inlet 42 on membrane 34 receives the fluid emitting end of tube 40. Air in membrane 34 may be exhausted by stretching inlet 42 sufficiently to form a vent opening along a side of tube 40 during the initial filling of membrane 34 with the fluid.

Fluid 36, in flowing around and through cage 26, completely envelops the portion of fibers 20 within membrane 34 making intimate contact with both the forward portion of membrane 34 and face 22. Fluid pressure in membrane 34 which may be regulated, as by increasing or decreasing the elevation y of supply 38 and/or the height of fluid therein, is adjusted so that the forward portion of membrane 34 is rendered sufficiently distended and of such resiliency as to maintain the aforementioned intimate contact with face 22 and yet be readily displaceable toward and against ends 32 of prongs 28 as illustrated in FIG. 2 when head 16 is applied with only slight pressure to a specimen such as living body tissue T.

In operation, head 16 of probe 14 is placed against tissue T substantially as illustrated in FIG. 2 with ends 32 of prongs 26 all indirectly in contact therewith through interposition of membrane 34. Membrane 34 thus assumes the surface configuration of tissue T bringing the tissue into optical contact with face 22 of fibers 20 through the media of transparent membrane 34 and fluid 36. Such optical contact between tissue T and face 22 may be enhanced by the application of a clear fluid such as mineral oil to the engaged portion of the tissue.

As it can be seen in FIG. 2, prongs 26, when in the aforementioned relationship with tissue T, function to align face 22 parallel to the surface of tissue T while permitting the portion of membrane 34 between ends 32 to flex slightly in response to pulsation, gradual recession or other such animation of tissue T as may occur during use of the probe. Thus, continuous contact with the area of a tissue intended to be examined is maintained by head 16 during prolonged periods of monitoring and/or measuring oxygen saturation of blood perfusing the tissue.

Oxygen saturation determinations are achieved as follows:

Light from source 12 received by afferent fibers 20' is conducted by internal reflection to face 22 within sensing head 16 and emitted into fluid 36 whereupon it is conducted by the fluid and transparent medium of membrane 34 into tissue T. In entering the tissue and blood vessels 44 such as are found in the derma, the light becomes peculiarly characterized as by certain wavelengths thereof becoming absorbed in different amounts according to the amount of oxygen contained in the blood. For example, wavelengths of approximately 805 m$\mu$ have substantially equal extinction coefficients for oxyhemoglobin and reduced hemoglobin in blood and thus become substantially equally absorbed by both. Wavelengths of approximately 650 m$\mu$, however, become absorbed in greater amounts by reduced hemoglobin than by oxyhemoglobin.

Unabsorbed portions of all wavelengths of the light which become diffusely reflected or back scattered by the blood and returned through the tissue are received by transparent membrane 34 and conducted by fluid 36 to face 22 of probe 14. Thereat, the reflected or returned light is received by efferent fibers 20" and conducted through probe 14 to photoelectric analyzing means 18. Specific wavelengths each centered close to the aforementioned 805 m$\mu$ and 650 m$\mu$ light are then separated one from the other and directed each to one of a pair of photodetectors 46a and 46b (FIG. 1).

Beam splitter 48 placed in the path of light emitted from fibers 20" divides the light into two equal parts one being transmitted to photodetector 46a and the other reflected to photodetector 46b as illustrated schematically in FIG. 1. Condenser lens 50 placed between the light emitting ends of fibers 20" and beam splitter 48 concentrates the transmitted and reflected light upon respective photodetectors 46a and 46b. Separation of the 805 m$\mu$ and 650 m$\mu$ wavelengths of light is effected by interference filters 52 and 54 positioned before photodetectors 46a and 46b respectively. Since filter 52 passes substantially only wavelengths of light of approximately 805 m$\mu$, photodetector 46a is responsive only to such light. Filter 54 passes substantially only wavelengths of light of approximately 650 m$\mu$ so that photodetector 46b is responsive only to the 650 m$\mu$ light. Since 805m$\mu$ light is substantially unaffected by changes in oxygen saturation in blood, as already mentioned, variations in the intensity of light received by photodetector 46a accordingly will not represent changes in oxygen saturation of the blood but will only represent changes in back-scattered light due to changes in the amount of blood present in the tissue as a result of the pulsatile character of the blood flow. The intensity of the 650 m$\mu$ light received by photodetector 46b, however, varies according to both the changes in oxygen saturation of the blood and those due to the pulsatile character of the blood flow. In order to determine the intensities of light back scattered by the tissue itself (i.e. "bloodless" tissue) sensing head 16 may be rendered relatively rigid by increasing the pressure of fluid 36 therein and pressed against tissue T with a force sufficient to squeeze the blood from the contacted area of the tissue. Thereupon, the intensities of the 805 m$\mu$ and 650 m$\mu$ light which are back scattered by the "bloodless" tissue are determined by measuring the responses of photodetectors 46a and 46b. When such determinations are subtracted from subsequent measurements taken with blood flowing in the normal fashion through the tissue, readings or measurements representative of the oxygen saturation of the blood alone may be obtained.

Determination of the blood"s oxygen saturation may be achieved by utilizing as photodetectors 46a and 46b a pair of photoconductors of the cadmium selenide type or the equivalent. Such photoconductors when placed one in each leg of a conventional electrical bridge circuit in the manner shown and described in U.S. Patent No. 3,177,757 provide suitable means for effecting measurement of the blood's oxygen saturation.

Changes in oxygen saturation may be monitored by noting changes in measurements thereof taken during periods of examination or by separately measuring changes in the amount of current conducted by photodetector 46b. As oxygen saturation drops in the blood, the intensity of light impinging on photodetector 46b drops thereby rendering photodetector 46b, accordingly, differently conductive with no substantial change in the conductance of photodetector 46a. Photodetectors for use in monitoring oxygen saturation may comprise a balanced pair of vacuum or gas-filled phototubes or photomultipliers each adapted to produce a measurable electric current or signal of a magnitude proportional to the intensity of light received thereby. In such case a measurement of the signal strength of the phototubes will provide an indication of changes in oxygen saturation of the blood.

It should be apparent that the electrical circuits and/or instrumentation for either reading or monitoring oxygen saturation may assume various forms other than those mentioned hereinabove. Since it is immaterial to this invention as to what form of instrumentation is utilized for measuring or monitoring light passing through filters 52 and 54, such instrumentation is illustrated in the drawing only to the extent of exemplary photodetectors 46a and 46b. More complete details may be obtained by those interested therein by reference to the aforementioned Patent No. 3,177,757.

It should be understood that the aforementioned 805 m$\mu$ and 650 m$\mu$ wavelengths of light are only exemplary of two of many wavelengths of light which may be selected for determining oxygen saturation of blood according to principles of this invention. The extinction coefficients for both oxyhemoglobin and reduced hemoglobin are approximately equal for 805 m$\mu$ light and are widely different for 650 m$\mu$ light. However, any other two wavelengths of light may be used provided their extinction coefficients for both oxyhemoglobin and reduced hemoglobin are not so high as to prevent measurement of the reflected light and further provided that there is an appreciable difference between the extinction coefficients of the selected wavelengths (i.e. the degree to which they are respectively absorbed by blood in tissue T).

While many body tissues and particularly the skin of newborn infants are thin and highly transparent, it is desirable in cases where greater thicknesses and less transparency is encountered to dilate the peripheral blood vessels in the area to be examined so as to stimulate a greater flow of blood therein. The greater volume of blood will, accordingly, back scatter or reflect a greater than usual amount of light whereby the amount of light absorbed by the tissue as a whole, including the blood, will be more representative of that absorbed by the blood than by the cellular substance of the tissue.

While dilation can be accomplished with histamine according to standard practice in dilating blood vessels, the present invention also contemplates effecting dilation through the use of tepid or hot water. To this end, membrane 34 may be modified by the addition of outlet 56 and outlet tube 58 both illustrated by dotted outline in FIG. 2.

Tepid or hot water taken from a tap or supply such as 38 is directed into membrane 34 through tube 40 and emitted, after circulating through cage 26 and over the forward portion of the membrane, through tube 58 having restriction 60 in its passage. By restricting the passage in tube 58 as by pinching with a clamp or the like, not shown, sufficient fluid pressure in membrane 34 is maintained to preserve its proper resiliency during use. Heat from the hot water in head 16 thus produces dilation of peripheral blood vessels in tissue T.

As illustrated in FIG. 1, all instrumentation such as light source 12, photoelectric light analyzing means 18 and proximal ends of fibers 20 may be conveniently contained in a casing such as illustrated by dot-dash outline 60 remote from the patient being examined. Flexible probe 14 may be of any convenient length, such as several feet, thus providing maximum freedom from cumbersome instrumentation in the selection of an approach to and placement of head 16 against the body while leaving the patient's body literally unencumbered for therapeutic, surgical or other such treatment. Probe 14 may, of course, be entered into body cavities, pits, folds of skin or other such obscure portions of a body for observing the oxygen saturation of blood perfusing tissues therein. It should also be apparent that the device of the invention may also be used to measure the amount and/or presence of dye injected into a blood stream in connection with dye dilution techniques used to study circulation of blood in living bodies.

I claim:

1. A sensing head on a light-emitting and light-receiving one end of a light-conducting member for optically coupling a light-reflecting speciment to said one end of said member wherein said sensing head comprises a transparent membrane of soft and pliable material enveloping said end of said light-conducting member and a transparent fluid within said membrane for maintaining the same resiliently distended and conformable to the shape of a light-reflecting specimen when said specimen is engaged by said membrane at a point opposite to said one end of said member whereby, when light is caused to be emitted from said one end of said member said light will be conducted afferently through said fluid and membrane into said specimen and portions thereof reflected by said specimen will be conducted efferently through said membrane and fluid respectively to said end of said member.

2. A sensing head as recited in claim 1 including a locating foot within said membrane, the foot being attached to said one end of said light-conducting member.

3. A sensing head as recited in claim 2 wherein said locating foot comprises a cage formed of a number of prongs each fixed to said light-conducting member adjacent said light emitting and receiving one end thereof.

4. A sensing head as recited in claim 3 wherein said prongs are each extended an approximate equal distance forwardly of said one end of the light-conducting member each that when all are disposed endways against a surface of said specimen, through interposition of the transparent membrane, the one end of said light-conducting member will assume a substantially parallel relationship with said specimen surface.

5. A sensing head as recited in claim 2 wheren said foot comprises a compression spring having one of its ends fixed to said light-conducting member adjacent the light emitting and receiving one end thereof and its opposite end disposed forwardly of the one end of said member.

6. A long and slender fiber optical probe adapted to serve as light sensing and transmitting means in apparatus for determining oxygen saturation of blood perfusing body tissues, said probe comprising a multiplicity of individually light-insulated afferent and efferent flexible light conducting fibers all bundled together in side-by-side relationship adjacent a distal end of said probe, the one ends of said fibers at said distal end of said probe being collectively arranged as a unitary light emitting and receiving face, said afferent fibers being separated from efferent fibers adjacent the opposite proximal end of said probe for receiving and conducting light to said face, a sensing head at said distal end of said probe including a transparent membrane of soft and pliable material enveloping said face, means for filling said membrane with a fluid adapted to conduct light from said afferent fibers to a specimen contacted by said membrane and to conduct portions of said light diffusely reflected by said specimen reversely to said face for recovery by said efferent fibers and conduction to said proximal end of said probe.

7. A fiber optical probe as recited in claim 1 further comprising a locating foot within said membrane, said foot being attached to said bundle of fibers.

8. A fiber optical probe as recited in claim 7 wherein said locating foot comprises a cage formed of a number of prongs each fixed to said bundle of fibers adjacent said light emitting and receiving face thereof.

9. A fiber optical probe as recited in claim 8 wherein said prongs are each extended an approximate equal distance forwardly of said face such that when all are disposed endways against the surface of a specimen, through interposition of said transparent membrane, said face will assume a substantially parallel relationship with said specimen surface.

10. A fiber optical probe as recited in claim 7 wherein said foot comprises a compression spring having one of its ends fixed to said bundle of fibers adjacent said light emitting and receiving face and its opposite end disposed forwardly of said face.

11. A fiber optical probe as recited in claim 6 wherein said means for filling said membrane with fluid comprises a flexible fluid delivery tube emanating from a source of fluid and an inlet at one side of said membrane in which said tube is received.

12. A fiber optical probe as recited in claim 11 further including a fluid outlet in said membrane permitting circulation of said fluid through the membrane.

13. The combination comprising a fiber optical probe as set forth in claim 1 further including a source of light for illuminating said afferent fibers adjacent said proximal end of said probe and means for receiving and analyzing light recovered and conducted by said efferent fibers to said proximal end of said probe.

14. The combination as recited in claim 13 wherein said means for analyzing said recovered light comprises a beam splitter for dividing such light into two substantially equal parts, photoelectric means arranged to receive each of said two parts of light one separately of the other and lens means for concentrating said parts of said light upon said photoelectric means.

15. The combination as recited in claim 14 further including means for filtering all but a one preselected narrow band of wavelengths from each of said two parts of said light received by said photoelectric means.

(References on following page)

References Cited

UNITED STATES PATENTS

| | | | |
|---|---|---|---|
| 3,068,793 | 12/1962 | Hicks et al. | 128—6 XR |
| 3,068,742 | 12/1962 | Hicks et al. | 128—6 XR |
| 3,123,066 | 3/1964 | Brumley | 128—2 |
| 3,162,190 | 12/1964 | Del Gizzo | 128—6 |
| 3,319,622 | 5/1967 | Shiner | 128—2 |
| 3,339,542 | 9/1967 | Howell | 128—2 |

RICHARD A. GAUDET, Primary Examiner

KYLE L. HOWELL, Assistant Examiner

U.S. Cl. X.R.

128—2.05; 356—41